(12) United States Patent
Dunbar et al.

(10) Patent No.: US 6,220,270 B1
(45) Date of Patent: Apr. 24, 2001

(54) BRAKE VELOCITY FUSE

(75) Inventors: Scott David Dunbar, Cedar Falls, IA (US); Timothy Lloyd Valentin, Searcy, AR (US)

(73) Assignee: Deer & Company, Moline, IL (US)

( * ) Notice: Subject to any disclaimer, the term of this patent is extended or adjusted under 35 U.S.C. 154(b) by 0 days.

(21) Appl. No.: 09/454,992

(22) Filed: Dec. 6, 1999

(51) Int. Cl.$^7$ ............................... B60T 8/94; G05D 16/10
(52) U.S. Cl. ................... 137/100; 137/87.01; 303/9.63
(58) Field of Search ..................... 137/87.01, 87.06, 137/100; 303/9.62, 9.63, 9.73, 9.74, 9.75

(56) References Cited

U.S. PATENT DOCUMENTS

| | | | |
|---|---|---|---|
| 3,774,974 | * 11/1973 | Braun | 303/9.63 |
| 3,914,736 | * 10/1975 | Nakamura et al. | 303/9.63 |
| 4,227,746 | * 10/1980 | Schopper et al. | 137/87.01 |
| 4,313,642 | * 2/1982 | Berisch | 303/9.63 |
| 4,691,795 | * 9/1987 | Wehmeyer et al. | 137/100 |
| 4,717,208 | * 1/1988 | Kubota | 303/9.62 |

* cited by examiner

Primary Examiner—Michael Buiz
Assistant Examiner—Ramesh Krishnamurthy

(57) ABSTRACT

An improved the velocity fuse valve controls communication between first and second brake valves and first and second brake lines. The velocity fuse valve includes a valve housing having a valve bore which slidably receives a valve spool. The spool moves in response to pressure in first and second pilot chambers, each communicated with a corresponding first and second outlet. The first pilot chamber is communicated with the first outlet via a first dashpot passage and a first orifice, and the second pilot chamber is communicated with the second outlet via a second dashpot passage and a second orifice. The orifices reduce or control how fast the spool will move in response to the pressure differential between the pilot chambers.

7 Claims, 3 Drawing Sheets

BRAKE VELOCITY FUSE

BACKGROUND OF THE INVENTION

This invention relates to a vehicle brake system, and more particularly, to a vehicle brake system which includes a secondary (emergency) brake function and a hydraulic valve which closes off a failed brake circuit and permits the other circuit to function normally.

The John Deere 8000T tractor has a hydraulic braking system which includes a velocity fuse spool valve which is located downstream of the brake valves. The velocity fuse valve includes a spool which is normally held in an open flow position by centering springs. The centering springs, in conjunction with the pilot areas on the spool define a differential pressure which must exist between the two brake circuits before a lock-out of one circuit occurs. The lockout occurs due to low pressure in the failed circuit. Once the low pressure in the failed circuit is low enough to produce the predetermined pressure differential, the pressure differential will shuttle the spool and close off the failed circuit. After the spool has shuttled, the other circuit is allowed to function normally. However, typically such a valve will shuttle at a pressure differential which is low enough such that normal, intermittent, short duration variations in brake pressure may cause undesired shuttling of the velocity fuse valve spool. It would be desirable to control or limit the sensitivity of such a velocity fuse valve and prevent undesired shuttling of the velocity fuse valve spool in such situations.

SUMMARY OF THE INVENTION

Accordingly, an object of this invention is to provide velocity fuse valve for a hydraulic braking system which reduces or prevents undesired activation of the velocity fuse valve.

Another object of this invention is to provide such a velocity fuse valve which minimizes circuit complexity and which requires no adjustments to set a cut-off pressure.

These and other objects are achieved by the present invention, wherein an improved the velocity fuse valve controls communication between first and second brake valves and first and second brake lines. The velocity fuse valve includes a valve housing having a valve bore which slidably receives a valve spool. The spool moves in response to pressure in first and second pilot chambers, each communicated with a corresponding first and second outlet. The first pilot chamber is communicated with the first outlet via a first dashpot passage and a first orifice, and the second pilot chamber is communicated with the second outlet via a second dashpot passage and a second orifice. The orifices reduce or control how fast the spool will move in response to the pressure differential between the pilot chambers.

DESCRIPTION OF THE PREFERRED EMBODIMENT

Figure 1:
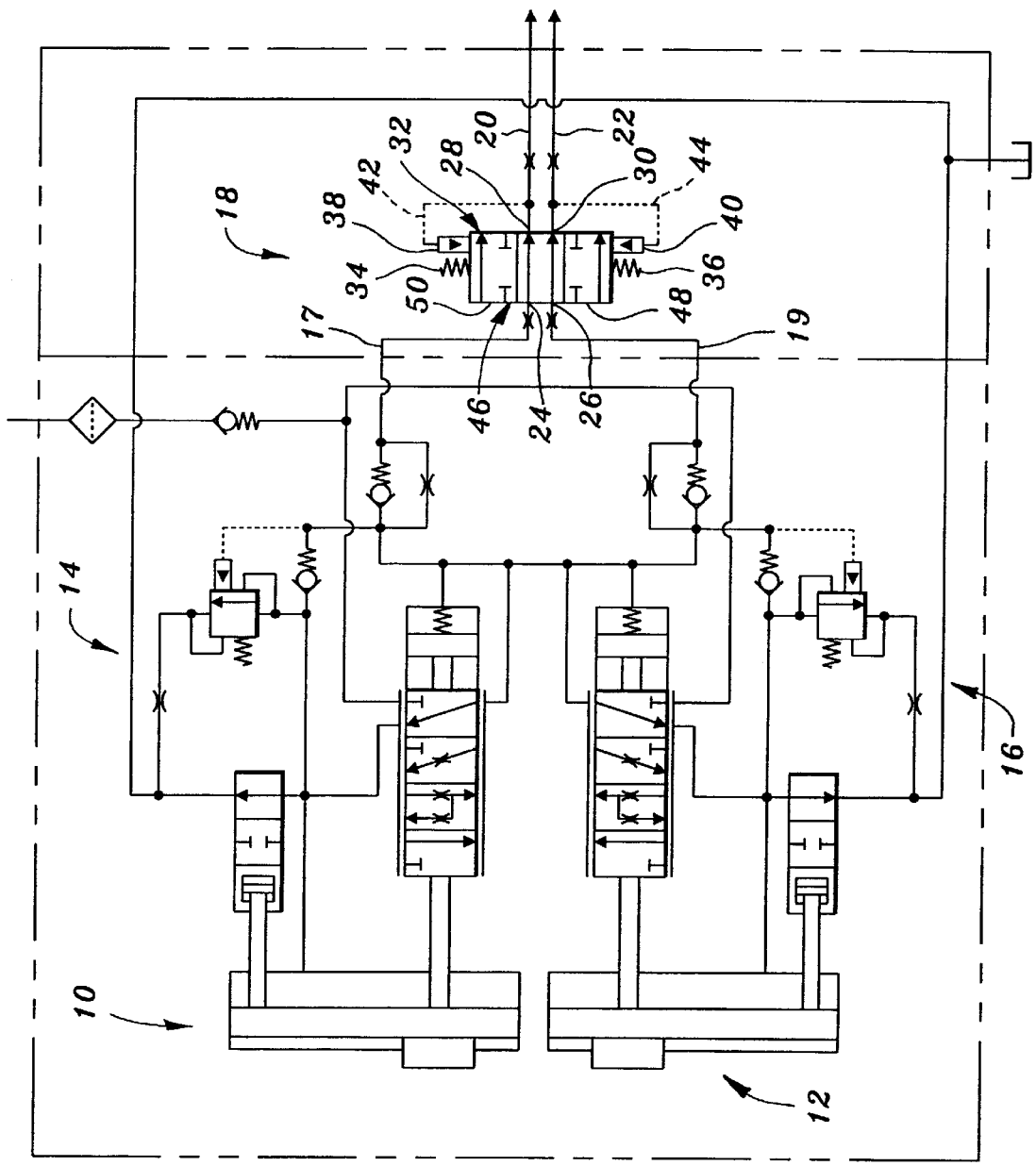
FIG. 1 is a schematic diagram of a prior art production brake circuit including a prior art production velocity fuse valve.

A prior art production brake circuit, including a velocity fuse valve, is shown in FIG. 1. The circuit includes left and right prefill pistons 10,12, and left and right brake valves 14, 16. The prior art velocity fuse valve 18 is connected between the output lines 17, 19 of the brake valves and the brake lines 20, 22 which communicate pressurized brake fluid to left and right brakes (not shown). The velocity fuse valve 18 includes inlets 24 and 26 which receive fluid from brake valves 14 and 16 and outlets 28 and 30 connected to the vehicle brakes (not shown), a spool 32. Centering springs 34 and 36 normally hold the spool in a centered, open position as shown in FIG. 1. Pilots 38 and 40 urge the spool 32 in opposite directions in response to fluid pressure communicated via lines 42 and 44, respectively. In its first centered, open position 46 the spool 32 communicates fluid from inlet 24 to outlet 28 and pilot 38, from inlet 26 to outlet 30 and pilot 40. When pressure at inlet 24 or outlet 28 drops, pilot 40 will shift spool 32 to a second position 48 wherein fluid communication between inlet 24 and outlet 28 is blocked and wherein fluid communication between inlet 26 and outlet 30 is open. When pressure at inlet 26 or outlet 30 drops, pilot 38 will shift spool 32 to a third position 50 wherein fluid communication between inlet 26 and outlet 30 is blocked and wherein fluid communication between inlet 24 and outlet 28 is open.

Figure 2:
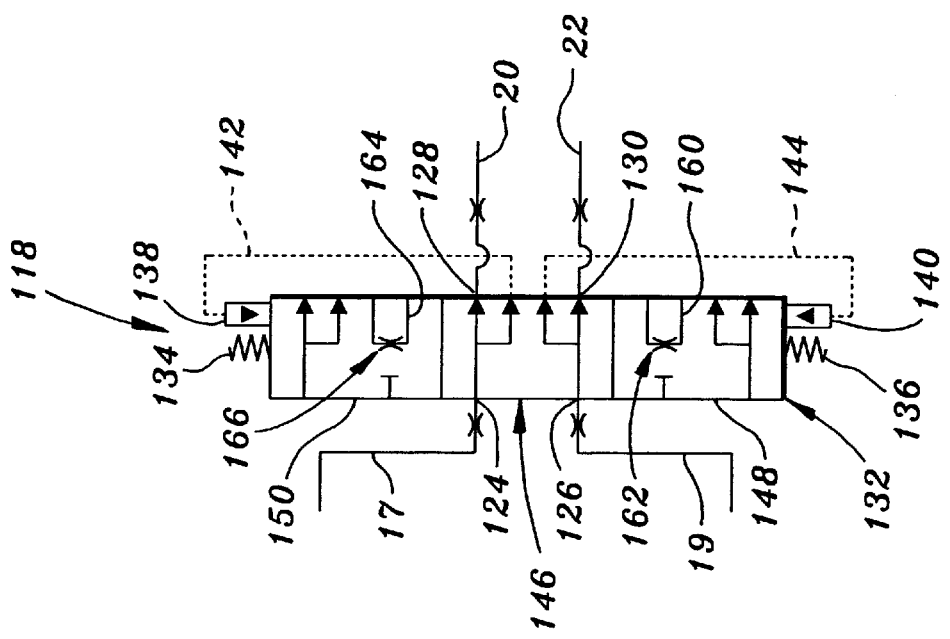
FIG. 2 is a schematic diagram of a velocity fuse valve according to the present invention.

Referring now to FIG. 2, the improved velocity fuse valve 118 of the present invention includes inlets 124 and 126 which receive fluid from lines 24 and 26 and outlets 128 and 130 connected to the vehicle brakes (not shown) and a spool 132. Centering springs 134 and 136 normally hold the spool in a centered, open position 146 as shown in FIG. 2. Pilots 138 and 140 urge the spool 132 in opposite directions in response to fluid pressure communicated via lines 142 and 144, respectively. The valve 118 also includes a dashpot passage 160 and orifice 162, and a dashpot passage 164 and orifice 166.

Figure 3:
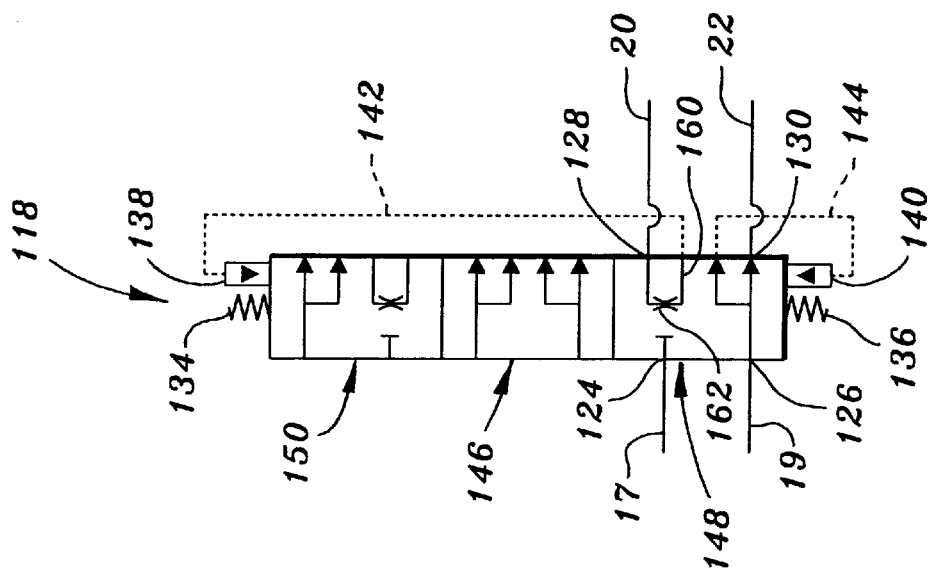
FIG. 3 is a schematic diagram of a velocity fuse valve displaced from the centered position shown in FIG. 2.

As best seen in FIG. 2, the valve 118 has a first position wherein the first inlet 124 is communicated with the first outlet 128 and with the first pilot 138 via line 142, and the second inlet 126 is communicated with the second outlet 130 and the second pilot 140 via line 144. As best seen in FIG. 3, the valve 118 has a second position wherein the first inlet 124 is blocked, wherein the first outlet 128 is communicated with the first pilot 138 via passage 160 and orifice 162 and line 142, and wherein the second inlet 126 is communicated with the second outlet 130 and with the second pilot 140 via line 144.

The valve 118 also has a third position (not shown in a separate drawing) wherein the second inlet 126 is blocked, wherein the second outlet 130 is communicated with the second pilot 140 via passage 164, orifice 166 and line 144, and wherein the first inlet is communicated with the first outlet 128 and with the first pilot 138. The valve 118 moves to the second position in response to reduced pressure in the first outlet 128, and moves to the third position in response to reduced pressure in the second outlet 130.

The orifices 162 and 166 restrict communication of pressure changes from the outlets to the corresponding pilots, and prevent the normal, intermittent, short duration variations in brake pressure from causing the valve to shuttle, so that the valve 118 instead shuttles only in response to significant longer duration pressure variations.

Figure 4:
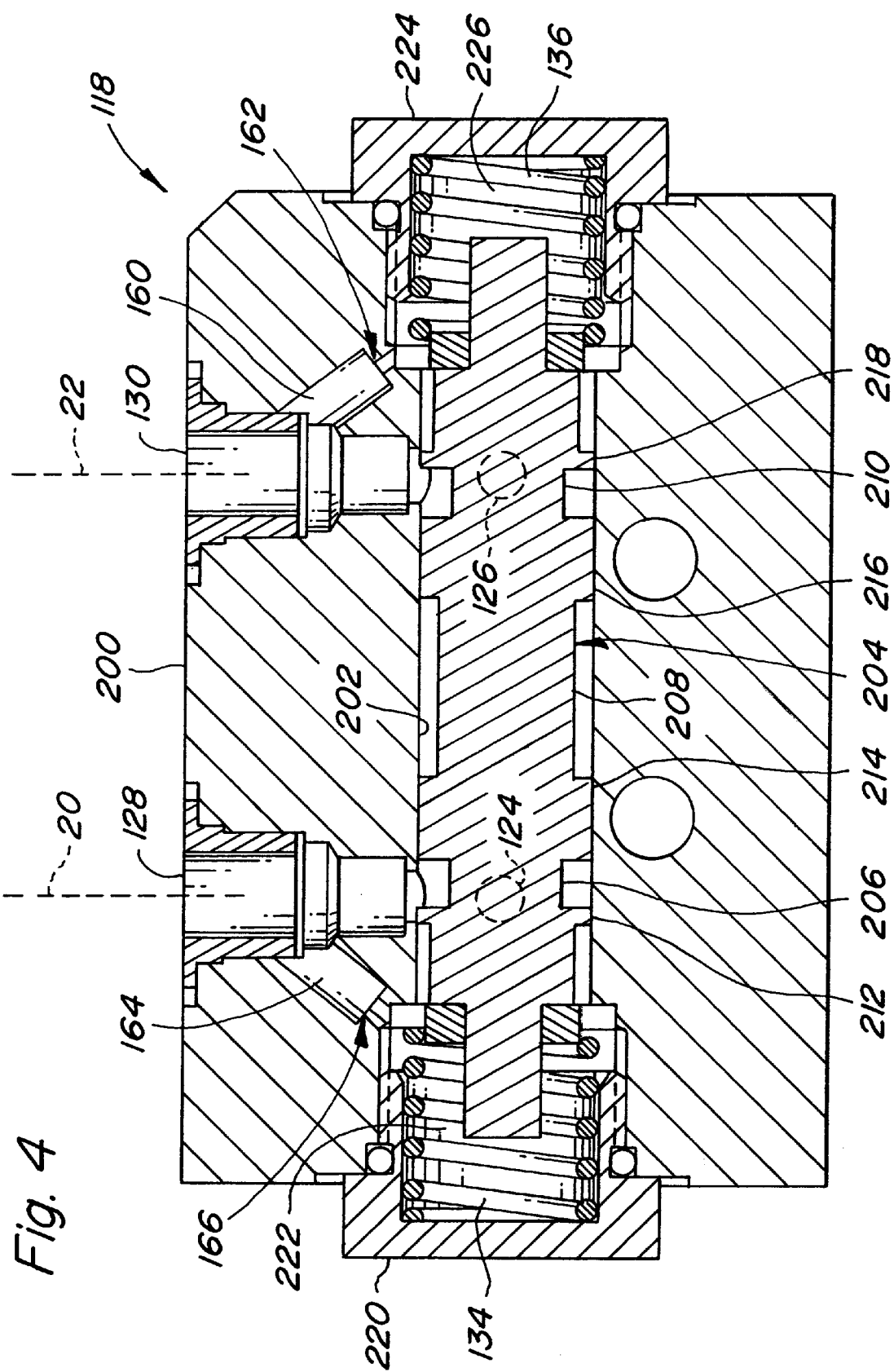
FIG. 4 is a sectional view of the velocity fuse valve of FIGS. 2 and 3.

Referring now to FIG. 4, the valve 118 has a housing 200 with a valve bore 202 extending therethrough. The valve bore is communicated with inlets 124 and 126 and with outlets 128 and 130. A valve member or spool 204 is slidably and sealingly received in the bore 202. Valve member 204 includes annular grooves 206, 208 and 210 which are arranged between lands 212, 214, 216 and 218. Land 212, the wall of bore 202 and plug 220 enclose a pilot chamber 222 in which is mounted spring 134. Land 218, the wall of bore 202 and plug 224 enclose a pilot chamber 226 in which is mounted spring 136. Dashpot passage 160 and orifice 162 connect pilot chamber 226 with outlet 130. Dashpot passage 164 and orifice 166 connect pilot chamber 222 with outlet 128. A sensor switch or switches (not shown) could be placed in the housing 200 in the region of groove 208 so as to engage either land 214 or 216 and thereby provide an operator warning signal upon displacement of the valve member 204 from its centered position.

In its first centered, open position 146 the spool 132 communicates fluid from inlet 124 to outlet 128 and pilot 138, from inlet 126 to outlet 130 and pilot 140. When pressure at inlet 124 or outlet 128 drops, the higher pressure in pilot chamber 226 (pilot 140) will shift spool 132 towards cap 220 against the force of spring 134 and reducing the volume of pilot chamber 222. This forces fluid out of chamber 222 through orifice 166 and passage 164 to outlet 128. The orifice 166 reduces or controls how fast the spool 132 can move in response to the pressure differential between chambers 226 and 222. Eventually, the spool 132 will move into its second position wherein land 214 will close communication between outlet 128 and groove 206 and inlet 124, wherein fluid communication between inlet 124 and outlet 128 is blocked, wherein fluid communication between inlet 126 and outlet 130 is open.

The valve 118 operates in a similar manner when the pressure at inlet 126 or outlet 130 drops—pressure in pilot chamber 222 will shift spool 132 to a third position 150 wherein fluid communication between inlet 126 and outlet 130 is blocked and wherein fluid communication between inlet 124 and outlet 128 is open.

While the present invention has been described in conjunction with a specific embodiment, it is understood that many alternatives, modifications and variations will be apparent to those skilled in the art in light of the foregoing description. Accordingly, this invention is intended to embrace all such alternatives, modifications and variations which fall within the spirit and scope of the appended claims.

What is claimed is:

1. In a brake system having first and second brake valves, first and second brake lines and a velocity fuse valve for controlling communication between each of the brake valves and a corresponding one of the brake lines, the velocity fuse valve comprising:

a valve housing having a valve bore extending therethrough, the valve housing having a first inlet communicated with the first brake valve, a second inlet communicated with the second brake valve, a first outlet communicated with the first brake line and a second outlet communicated with the second brake line;

a first pilot chamber communicated with the first outlet, a second pilot chamber communicated with the second outlet;

a valve member slidably received in the bore and movable in response to fluid pressure communicated to the pilot chambers, the valve member having a first position wherein the first inlet is communicated with the first outlet and with the first pilot chamber, and the second inlet is communicated with the second outlet and the second pilot chamber, the valve member having a second position wherein the first inlet is blocked, wherein the first outlet is communicated with the first pilot chamber, and wherein the second inlet is communicated with the second outlet and with the second pilot chamber, the valve member having a third position wherein the second inlet is blocked, wherein the second outlet is communicated with the second pilot chamber, and wherein the first inlet is communicated with the first outlet and with the first pilot chamber, the valve member being movable to the second position in response to reduced pressure in the first outlet, the valve member being movable to the third position in response to reduced pressure in the second outlet, the first pilot chamber is communicated with the first outlet via a first dashpot passage and a first orifice, and the second pilot chamber is communicated with the second outlet via a second dashpot passage and a second orifice.

2. The velocity fuse valve of claim 1, wherein:

the valve member comprises a cylindrical spool having first, second, third and fourth annular lands formed thereon, having a first annular groove formed between the first and second lands, a second annular groove formed between the second and third lands and a third annular groove formed between the third and fourth lands, the second land closing communication between the valve bore and the first outlet when the valve member is in its second position and the third land closing communication between the valve bore and the second outlet when the valve member is in its third position.

3. The velocity fuse valve of claim 2, wherein:

the first land closes communication between the first pilot chamber and the first outlet via the valve bore when the valve member is in its second position; and the fourth land closes communication between the second pilot chamber and the second outlet via the valve bore when the valve member is in its third position.

4. The velocity fuse valve of claim 1, wherein:

the first and second outlets are formed by first and second outlet bores which extend substantially perpendicularly with respect to a longitudinal axis of the valve bore;

the valve housing and a first end of the valve member enclose the first pilot chamber, the valve housing and a second end of the valve member enclose the second pilot chamber; and a first dashpot passage extends through the valve housing between the first outlet bore and the first pilot chamber, a second dashpot passage extends through the valve housing between the second outlet bore and the second pilot chamber; and a first orifice is formed by a narrow portion of the first dashpot passage, and a second orifice is formed by a narrow portion of the second dashpot passage.

5. The velocity fuse valve of claim 4, wherein:

a first centering spring is mounted in the first pilot chamber, and a second centering spring is mounted in the second glot chamber.

6. The velocity fuse valve of claim 4, wherein:

the first dashpot passage extends at an angle with respect to the first outlet bore, and the second dashpot passage extends an angle with respect to the second outlet bore.

7. The velocity fuse valve of claim 4, wherein:

each dashpot passage comprises a larger diameter bore portion which opens into the corresponding one of the outlet bores and a smaller diameter bore portion which opens into the corresponding one of the pilot chambers.

* * * * *

UNITED STATES PATENT AND TRADEMARK OFFICE
CERTIFICATE OF CORRECTION

PATENT NO. : 6,220,270 B1
DATED : April 24, 2001
INVENTOR(S) : Scott David Dunbar et al.

It is certified that error appears in the above-identified patent and that said Letters Patent is hereby corrected as shown below:

<u>Title page,</u>
Item [73], Assignee, delete "Deer" and insert -- Deere --.

Signed and Sealed this

Thirtieth Day of July, 2002

Attest:

Attesting Officer

JAMES E. ROGAN
*Director of the United States Patent and Trademark Office*

UNITED STATES PATENT AND TRADEMARK OFFICE
CERTIFICATE OF CORRECTION

PATENT NO.      : 6,220,270 B1
DATED           : April 24, 2001
INVENTOR(S)     : Scott David Dunbar et al.

It is certified that error appears in the above-identified patent and that said Letters Patent is hereby corrected as shown below:

<u>Title page,</u>
Item [73], Assignee, add -- Vickers, Inc, Searcy, Arkansas (US) --.

Signed and Sealed this

Twenty-seventh Day of May, 2003

JAMES E. ROGAN
*Director of the United States Patent and Trademark Office*